US008380679B2

(12) United States Patent
Majumdar et al.

(10) Patent No.: US 8,380,679 B2
(45) Date of Patent: Feb. 19, 2013

(54) METHOD OF HANDLING TRANSACTION IN A SERVICE ORIENTED ARCHITECTURE ENVIRONMENT

(75) Inventors: Bijoy Majumdar, Secunderabad (IN); Anshuk Pal Chaudhuri, Kolkata (IN); Sunny Saxena, Hyderabad (IN)

(73) Assignee: Infosys Technologies Limited (IN)

( * ) Notice: Subject to any disclaimer, the term of this patent is extended or adjusted under 35 U.S.C. 154(b) by 304 days.

(21) Appl. No.: 12/366,052

(22) Filed: Feb. 5, 2009

(65) Prior Publication Data

US 2009/0327806 A1 Dec. 31, 2009

(30) Foreign Application Priority Data

Feb. 11, 2008 (IN) .............................. 347/CHE/2008

(51) Int. Cl.
*G06F 17/30* (2006.01)
(52) U.S. Cl. ....................................... 707/684; 707/703
(58) Field of Classification Search .................. 709/203, 709/224, 204; 707/607, 648, 654, 674, 678, 707/682, 683, 684, 687, 694, 703, 704, 999.102, 707/999.104, 691, 679, 638, 686, 999.103, 707/999.202
See application file for complete search history.

(56) References Cited

U.S. PATENT DOCUMENTS

| 7,877,360 | B2 * | 1/2011 | Rohit et al. ................... 707/648 |
| 7,921,084 | B2 * | 4/2011 | Srivastava et al. ............ 707/687 |
| 7,930,052 | B2 * | 4/2011 | Virgil et al. ................... 700/105 |
| 2003/0050972 | A1 * | 3/2003 | Felt et al. ....................... 709/203 |
| 2004/0010584 | A1 * | 1/2004 | Peterson et al. .............. 709/224 |
| 2005/0050141 | A1 * | 3/2005 | An et al. ........................ 709/203 |
| 2006/0136555 | A1 * | 6/2006 | Patrick et al. ................. 709/203 |
| 2007/0073764 | A1 * | 3/2007 | Oks et al. ....................... 707/102 |
| 2010/0042425 | A1 * | 2/2010 | Watson et al. .................... 705/1 |

\* cited by examiner

*Primary Examiner* — Greta Robinson
(74) *Attorney, Agent, or Firm* — Lerner, David, Littenberg, Krumholz & Mentlik, LLP

(57) ABSTRACT

A method of handling transactions in a plurality of organization embracing Service Oriented Architecture (SOA) is disclosed. The method includes invoking the transaction when at least one application registers for the transaction, by recognizing one or more services associated to the registered transaction context. The method also includes identifying one or more operations which needs to be initiated for executing each of the respective service. The method further includes revoking the transaction when an error is encountered during the transaction. The process of revoking the transaction includes rolling back the executed operations of the respective services when at least one of the identified operations of the recognized services encounters an error during the transaction.

19 Claims, 7 Drawing Sheets

METHOD OF HANDLING TRANSACTION IN A SERVICE ORIENTED ARCHITECTURE ENVIRONMENT

BACKGROUND OF THE INVENTION

The present invention relates to a transaction management, and more particularly, to a method of handling transactions, to overcome concurrency issues and data discrepancy issues, of a plurality of enterprises embracing a Service Oriented Architecture (SOA) in their business interaction.

In the present business scenario, for a plurality of enterprises, transactions are an indispensable part of their business interactions. Transactions may be defined as an indivisible unit of work comprised of several operations. Each operation of the transaction must be performed to conserve data integrity. Transactions live to a guarantee that all necessary operations are properly executed, if any single operation fail, the complete flow of the business interactions should also fail in order to maintain data integrity. Generally, all transactions share the same properties of Atomicity, Consistency, Isolation and Durability (herein referred as "ACID"), which need to be governed by all transaction.

Nowadays, the plurality of enterprises are embracing a Service Oriented Architecture (herein referred as "SOA"), in their business interaction to provide better services to their customers. The SOA may be a disruptive approach to organize and manage all of the resources, within and external, of the enterprise. In an environment based on SOA, the plurality of enterprises by representing IT functionality as services may allow the customers or business users to compose the services in a flexible and agile manner defined by the business, rather than a technical associate of the enterprise. Thus, adding an extra layer of complexity in the transaction due to this self contained characteristic of the services.

The services are normally stateless, distributed and at times asynchronous in nature. In SOA based environment, the services are exposed and shared among systems in a loosely coupled, platform independent manner. These services may involve vital information at varied business interactions, like monetary payment through credit cards, validation of the customer or notification by emails, etc. Through service coordination and choreography, it may be possible to collect these set of services and make them work seamlessly for a particular business operation in a distributed network. The risks involved though, would be concurrency issues and data discrepancy that can creep up during these transactions. Ensuring data integrity for transactions in SOA may be very complicated and may require a transaction management mechanism that defines a protocol and makes an effort to govern the ACID properties across the technology agnostic services.

Currently, there is lot of work going on in defining different mechanisms for handling transaction management, which ensures data integrity in SOA. The mechanism may include WS-Coordination or WS-Atomic transaction or WS-Business activity or HP web services transactions. Most of the above mentioned transaction management mechanism show bottleneck in terms of propagating from one transactional system to other, as the underlying implementation is quite different and the specifications defined are still not matured. More importantly, the current work in WS-* and HP space provides multiple specification and standard for different complexity levels of transactions. As a result, the mechanisms for handling transactions are different from business to business depending on needs and complexity.

Thus, there is a need for a mechanism that may help to overcome the above mentioned issues laid out by the SOA paradigm for handling transaction and still retain the loosely coupled, technology agnostic, platform independent characteristics of the services in SOA environment and handle complex business interactions of the transaction.

BRIEF SUMMARY OF THE INVENTION

A comprehensive approach of handling a transaction in a plurality of enterprises embracing service oriented architecture (herein referred as "SOA") in their business interaction. Such approach may permit one or more transactions of a respective enterprise(s) to be secure, and may be helpful in overcoming concurrency issue and data discrepancy issue.

In one embodiment of the present technique, a method of handling the transaction in the plurality of organization embracing SOA is detailed. The method may comprise two steps, which includes invoking the transaction when at least one application registers for the transaction context and revoking the transaction by rolling back every step in the transaction when an error is encountered during the transaction.

In one embodiment of the present technique, the method comprising invoking the transaction includes may include recognizing one or more services associated to the registered transaction context for delivering a desired functionality of the application. The method may further include identifying one or more operations of the recognized services, which needs to be initiated for executing each of the respective service.

In one embodiment of the present technique, the method comprising revoking the transaction may include rolling back the executed operations of the respective services when at least one of the identified operations of the recognized services encounters an error during the transaction.

In another embodiment of the present technique, the plurality of operations of each service may include at least one of a read operation or a target operation or a delete operation or a write operation or combinations thereof.

In another embodiment of the present technique, the plurality of operations may be initiated sequentially for executing one or more services of the transaction context.

In yet another embodiment of the present technique, invoking the transaction may further include identifying a transaction compromise level applicable for the respective application. Revoking the transaction may further include compensating the executed operations of the respective service invoked while transaction.

BRIEF DESCRIPTION OF THE DRAWINGS

The above mentioned features as well other features, aspects, and advantages of the present invention will become better understood when the following detailed description is read with reference to the accompanying drawings in which like characters represent like parts throughout the drawings, wherein.

DETAILED DESCRIPTION

The following description is full and informative description of the best method and system presently contemplated for carrying out the present invention, which is known to the inventors at the time of filing the patent application. Of course, many modifications and adaptations will be apparent to those skilled in the relevant arts in view of the following description in view of the accompanying drawings and the appended claims. While the system and method described herein are provided with a certain degree of specificity, the present technique may be implemented with either greater or lesser specificity, depending on the needs of the user. Further, some of the features of the present technique may be used to advantage without the corresponding use of other features described in the following paragraphs. As such, the present description should be considered as merely illustrative of the principles of the present technique and not in limitation thereof, since the present technique is defined solely by the claims.

The present invention relates to a method of handling transaction in a plurality of organizations embracing a Service Oriented Architecture (herein referred as "SOA") in their business interaction. The method details an approach in handling transaction efficiently to overcome concurrency issue and data discrepancy issue, which may arise during transaction in SOA environment.

The following description is presented to enable a person of ordinary skill in the art to make and use the invention and is provided in the context of the requirement for obtaining a patent. The present description is the best presently contemplated method for carrying out the present invention. Various modifications to the preferred embodiment will be readily apparent to those skilled in the art and the generic principles of the present invention may be applied to other embodiments, and some features of the present invention may be used without the corresponding use of other features. Accordingly, the present invention is not intended to be limited to the embodiment shown but is to be accorded the widest scope consistent with the principles and features described herein.

Figure 1:
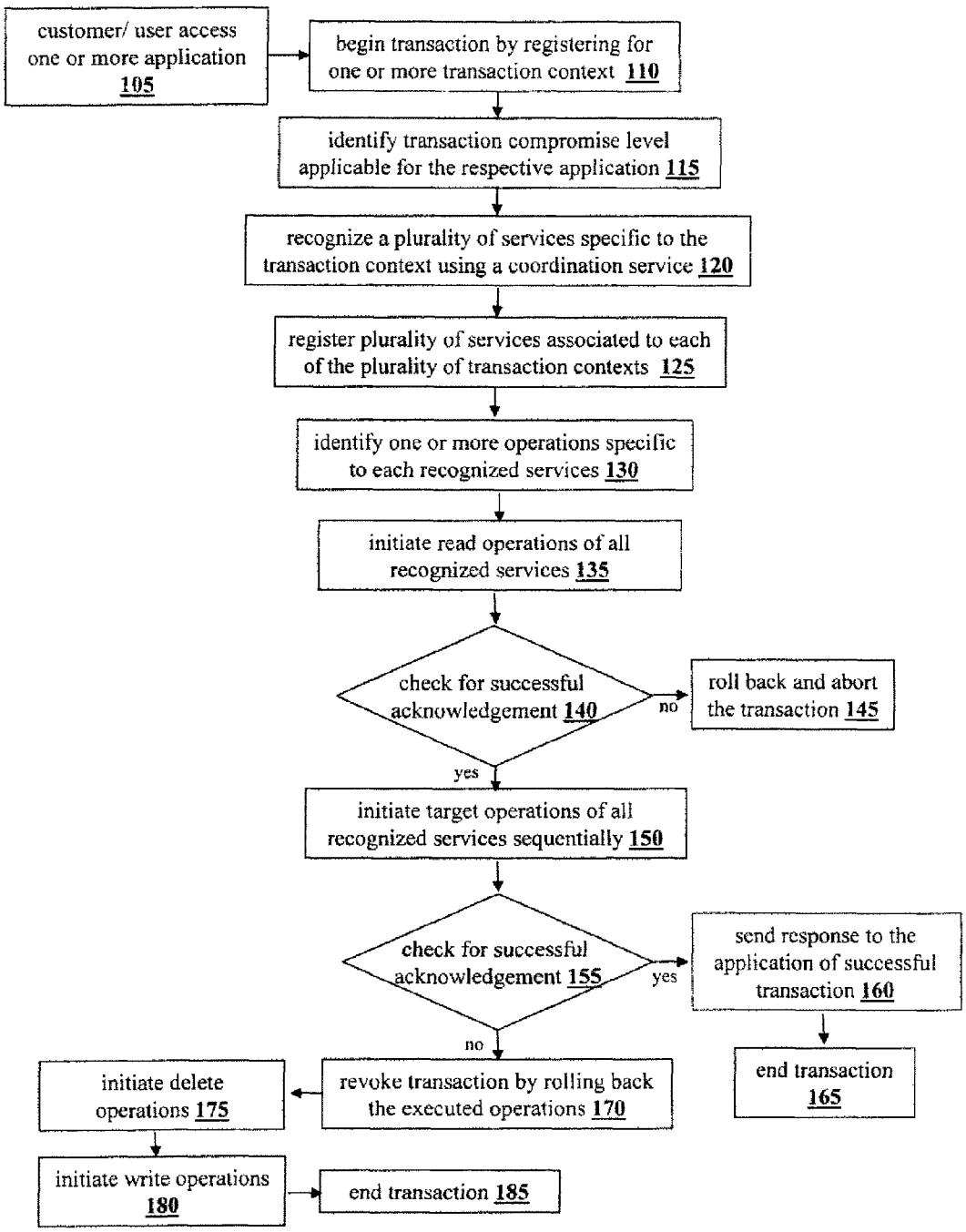
FIG. 1 is a flow diagram depicting a method of handling transaction in a respective organization embracing service oriented architecture (herein referred as "SOA"), according to one embodiment of the present technique.

Referring to the figures, FIG. 1 is a flow diagram showing a method of handling transaction in a respective organization embracing SOA, according to one embodiment of the present technique. In one embodiment of the present technique, the method comprises two steps, which includes invoking the transaction when at least one application registers for the transaction context and revoking the transaction by rolling back every step in the transaction when an error is encountered during the transaction.

The method comprising: 1) customer or user access one or more application (block 105), 2) begin transaction by registering for one or more transaction context (block 110), 3) identify transaction compromise level applicable for the respective application (block 115), 4) recognize a plurality of services specific to the transaction context using a coordination service (block 120), 5) register plurality of services associated to each of the plurality of transaction contexts (block 125), 6) identify one or more operations specific to each recognized services (block 130), 7) initiate read operations of all recognized services (block 135), 8) check for successful acknowledgement (block 140), 9) roll back and abort the transaction (block 145), 10) initiate target operations of all recognized services sequentially (block 150), 11) check for successful acknowledgement (block 155), 12) send response to the application of successful transaction (block 160), 13) end transaction (block 165), 14) revoke transaction by rolling back the executed operations 170 (block 170), 15) initiate delete operations (block 175), 16) initiate write operations (block 180), and 17) end transaction (block 185). Each of the steps will be explained in greater extent in the subsequent sections to follow.

In step 105, the user access one or more application of the respective organization. In one embodiment of the present technique, the application may include package or product or service devised by the respective organizations to provide the desired function to the user. By accessing the application the users may compose one or more services to achieve different business function of the organization. In one exemplary example of the present technique, the application may be a library management system comprising one or more services embedded within it for providing the plurality of function to the user. Certain application may utilize the participation of one or more services in order to provide a defined functionality. Accessing the application by the users marks the beginning of the transaction, by registering for one or more transaction context of the respective application as shown in step 110. The transaction context may comprise list of all of services associated to the respective application. A transaction compromise level applicable for the respective application is identified as shown in step 115. The transaction compromise level may be helpful in determining a transaction isolation with which the level of integrity is maintained for the organizations' business information or business data in a transaction. The transaction compromise may thus define an execution integrity level for one or more operations of the respective service, to achieve the determined transaction isolation level. The execution integrity level may be a time bound approach or a lock bound approach on one or more operations of the respective service, to achieve the determined transaction isolation on business information or business data of the respective organization.

In step 120, the transaction begins by recognizing one or more services associated to each of the plurality of transaction contexts, which are maintained in a coordination service. The coordination service may be a file comprising list of all services associated to the respective transaction context. The service may provide one or more functionality. In an environment based on SOA, each function is defined as a service. A certain application may utilize the participation of many services in order to provide the desired functionality. The principles of SOA define services as separate, platform and system independent entities. Each service capable of functioning on their own, thus providing reusability and interoperability across disparate platforms. These services may be representing Information Technology (herein referred as "IT") functionality, which the user may compose in a flexible and agile manner defined by the business of the respective organization. In one embodiment of the present technique, the plurality of services associated to the library management system may include a check book availability service or a lend book service or a get credit card details service or a notification service or combinations thereof. The plurality of service may be internal services or external services. The internal services may be providing the internal functionality of the organization, to the user. The external services may employ one or more services of the external organization to provide the desired functionality.

In step 125, one or more recognized services associated to each of the plurality of transaction contexts are registered. In one embodiment of the present technique, the process of registering may include determining the availability of each services associated with the transaction context for beginning transaction. If one or more recognized services are not available, the transaction may not begin and the user may be intimated about the unavailability of the services and temporary suspension of the transaction.

In step 130, one or more operations specific to each recognized services are identified. In one embodiment of the present technique, each of the operations may be initiated to execute the respective services. One or more operations for executing each of the recognized service may include at least one of a read operation or a target operation or a delete operation or a write operation or combinations thereof.

In one embodiment of the present technique, the read operation may include reading a current state of a database and placing the read operation in a queue. The reading operation may further include maintaining a log entry of a data from the current state of the database at a service layer or at a coordination messaging layer.

The service layer may be a container where the services are hosted. The services may save the current snapshot of the data it executes on, in some form in the hosting container. The coordination messaging layer is the intermediary from where services or callback operations are called. The intermediary or messaging layer may access the callback operations and save the state of data in some form for later retrieval. Generally, the coordination layer in an enterprise perspective is the messaging platform or ESBs (Enterprise Service Bus) of the world.

In one embodiment of the present technique, the read operation maintaining the log entry may be a time bound process or an alert bound process or both. In the time bound process the log of the data are maintained with a timestamp on the data. In one embodiment of the present technique, the time bound process is initiated through the time bound approach as defined by the execution integrity level of the transaction compromise level. In the alert bound process a read operation may impose a lock on the data and the lock may persist till the transaction completes. The lock may be imposed to maintain the transaction isolation required for transaction to complete for the respective application. In one embodiment of the present technique, the alert bound process is initiated through the lock bound approach as defined by the execution integrity level of the transaction compromise level.

In one embodiment of the present technique, the target operation may execute the task of respective service for delivering the desired functionality of the application. The target operation may modify the data with a target data, in the database, on successful execution. The target operation for executing the respective service may be initiated by at least one of a successful acknowledgement receipt from the plurality of read operation of one or more services or a successful acknowledgement receipt from the target operation of the previous service or both. The target operation may either lead to another target operation of different service or may lead to delete and write operation or may lead to closure of transaction depending on the outcome of the operation. On successful execution of the target operation, the subsequent target operations of the other services may be initiated, if any or closure of transaction if the target operation is last operation. On un-successful execution or on encountering an error, the target operation may lead to roll back by calling the delete operation and the write operation.

In one embodiment of the present technique, the delete operation is initiated on encountering the error, which may include at least one of a failure occurred during invoking the transaction or a failure occurred during initiating the read operation of the respective service or a timed out error occurred during executing the plurality of operations or combinations thereof. The process of rolling back the executed operation may include rolling back the target operation by calling the delete operation followed by the write operation. The delete operation may obliterate the target data updated by the target operation while executing the respective service.

In one embodiment of the present technique, the write operation may amend the target data updated by the target operation while executing the respective service with the data maintained in log entry while initiating the read operation of the respective service. The write operation may thus help in restoring the original data in the database, which was stored while beginning the transaction.

In step 135, the read operation of all recognized services of the transaction context is initiated prior to the initiation of other operations of the plurality of services. In one embodiment of the present technique, the acknowledgement is sent to the transaction context to indicate the status of the initiating the read operation.

In step 140, the acknowledgement is checked for the status, if the status is not successful, the transaction is revoked by rolling back the executed operations of the respective services. The process of rolling back the executed operations may include rolling back the target operation by calling the delete operation followed by the write operation, as shown in step 145. If the status of the acknowledgement is successful, the target operations of all recognized services are initiated sequentially, as shown in step 150. The target operation may be executed to achieve the desired functionality of the application. Each of the target operation may send the acknowledgement to the calling operation.

In step 155, the acknowledgement of each target operations is checked to determine the status of the execution. In one embodiment of the present technique, if the acknowledgements of all target operations are successful, a response is sent to the application about successful execution of the transaction, as shown in step 160, and the marks the end of the transaction, as shown in step 165, by clearing the data maintained in the log entry, while initiating one or more read operation for the plurality of services.

If the status of the acknowledgment is un-successful, the transaction may be revoked by rolling back the executed operations, as shown in step 170. The process of rolling back the executed operation may be performed to retain original data in the database, thus in tern maintaining data consistency. The process of rolling back the executed operations may include rolling back all executed target operation by calling the delete operation followed by the write operation, as shown in step 175 and 180 respectively. In step 175, the delete operation may obliterate the target data updated by the target operation while executing the respective service. In step 180, the write operation may amend the target data updated by the target operation while executing the respective service with the data maintained in log entry while initiating the read operation of the respective service. The write operation may thus help in restoring the original data in the database, which was stored while beginning the transaction and thus marks the end of the transaction, as shown in step 185, by clearing the data maintained in the log entry, while initiating one or more read operation for the plurality of services.

Figure 2:
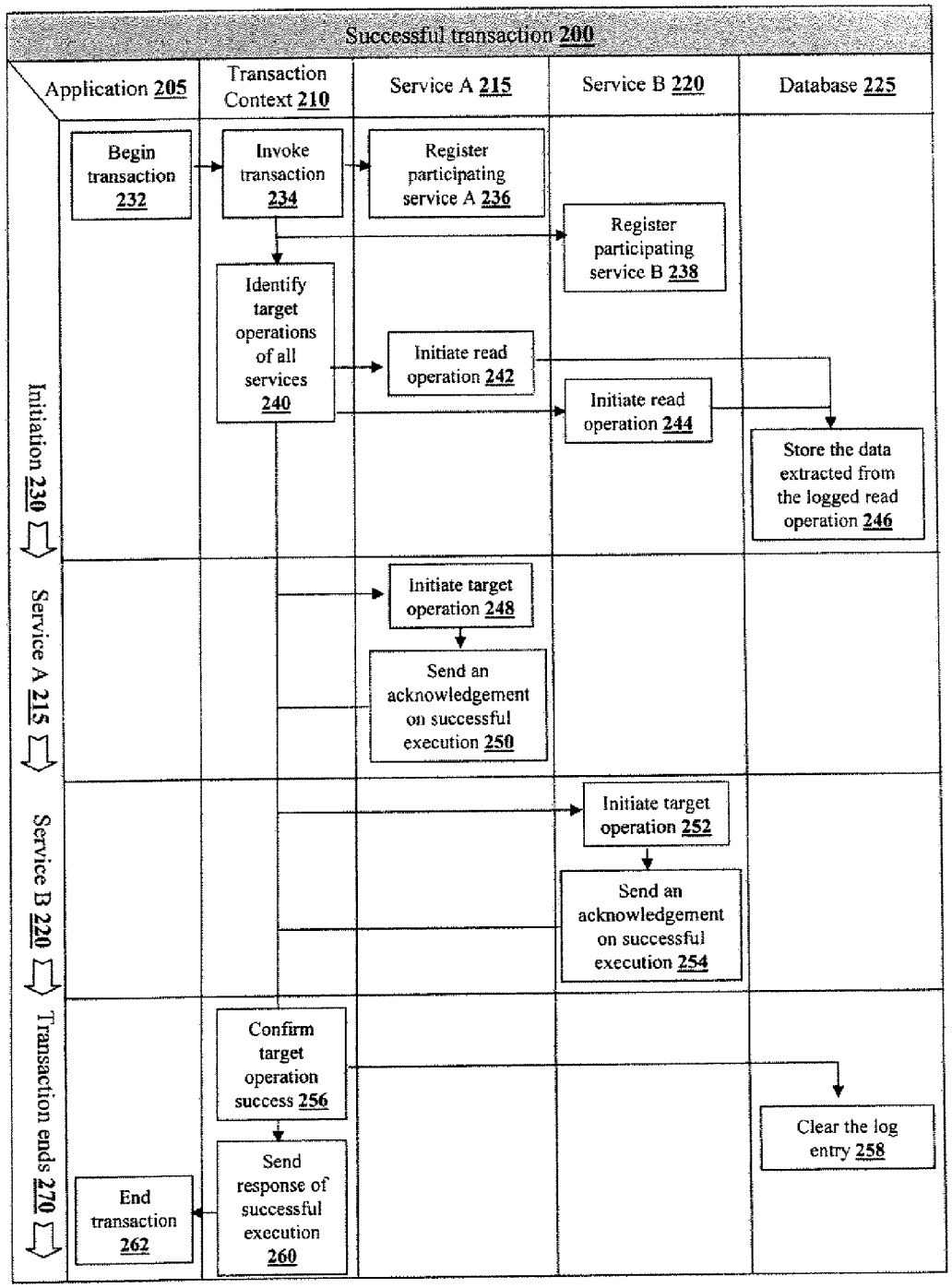
FIG. 2 is a flow diagram illustrating a method of handling a successful transaction in the respective organization embracing SOA, according to one embodiment of the present technique.

Referring to the figures, FIG. 2 is a flow diagram illustrating a method of handling a successful transaction 200 in the respective organization embracing SOA, according to one embodiment of the present technique. In one embodiment of the present technique, an application 205 is considered to be comprising one transaction context 210, and two services, which includes service-A 215 and service-B 220 and a database 225. The exemplary embodiment of the present technique is detailed considering a time bound approach as defined by the execution integrity level of the transaction comprise level. However, the application 205 may comprise more transaction context 210 and services, which are omitted or simplified in order not to obscure the illustrative embodiments. The scope of the handling successful transaction 200 should not be limited in light of the present technique. The present invention may be practiced with modification and alteration within the spirit and scope of the appended claims. Thus, the description is to be regarded as illustrative instead of restrictive on the present invention.

The method as per one embodiment of the present technique is explained in three phase. The first phase being initiation 230, which details the necessary steps of beginning the transaction. The second phase being the service execution phase, which includes execution of the services to achieve the desired functionality. In one exemplary embodiment of the present technique, the service phase may include execution of service-A 215 and service-B 220. The third phase is transaction ends 270, which marks the end to the transaction by taking necessary action (which will be detailed in subsequent sections to follow). Each phase will be explained in greater extent in the subsequent sections to follow.

The initiation phase 230 may comprise: 1) begin transaction (block 232), 2) invoke transaction (block 234), 3) register participating service-A (block 236), 4) Register participating service-B (block 238), 5) Identify target operations of all services (block 240), 6) initiate read operation (block 242), 7) initiate read operation (block 244), and 8) store the data extracted from the logged read operation (block 246). Each step of the phase initiation 230 will be explained in greater extent in the subsequent sections to follow.

In step 232, the beginning of the transaction is marked when one or more users access the application 205. The application may be hosted or presented by the plurality of organization embracing SOA in their business interaction. The beginning of transaction initiates the transaction context 210 of the application 205 to be registered and the transaction gets invoked as shown in step 234. The transaction context 210 recognizes service-A 215 and service-B 220 and registers both services, as shown in step 236 and step 238 respectively, and also checks the availability of both services for transaction. One or more operations of each service are also identified to execute the services to achieve the desired functionality. Each service may comprise a read operation or a target operation or a delete operation or a write operation. In one embodiment of the present technique, all operations of each service may be initiated sequentially.

In step 240, the target operations of all services are identified, this may be helpful to determine the functionality of all services to be attained by their respective target operation. In the current scenario, the target operations of service-A 215 and service-B 220 are identified. The read operations of service-A 215 and service-B 220 are initiated sequentially, as shown in step 242 and step 244 respectively. On successful initiation of read operation of both service, the current state of a database 225 are read and the read operation in placed in a queue, as shown in step 246. The process of reading the current status of the database 225 may include maintaining a log entry of a data from the current state of the database 225 at a service level or at a coordination messaging level. The log entry may include recording the data available in the database 225 with a timestamp, since the transaction is considered off the time bound approach.

The service execution phase may comprise of execution of two services service-A 215 and service-B 220. The service-A 215 execution comprise: 1) initiate target operation (block 248), and send an acknowledgement (block 250). The service-B execution comprise: 1) initiate target operation (block 252), and send an acknowledgement (block 254).

In step 248, the target operation of the service-A 215 is initiated. The initiation of target operation of service-A 215 may happen post receiving the acknowledgement from the initiation phase 230 about successfully executing the read operation of service-A 215 and service-B 220. If the read operation of any of the two services is not executed, the process of revoking the transaction may happen. The target operation of the service-A is executed, and post execution of the target operation of service-A 215, a successful acknowledgement is sent to the transaction context 210 to indicate the successful execution of the target operation, as shown in step 250. The execution of the target operation may include updating the data with the target data, as per the transaction.

In step 252, the target operation of the service-B 220 is initiated. The initiation of target operation of service-B 220 may happen post receiving the successful acknowledgement of service-A 215 from transaction context 210. The target operation of the service-B 220 is initiated for execution, and post execution of the target operation of service-B 220, a successful acknowledgement is sent to the transaction context 210 to indicate the successful execution of the target operation, as shown in step 254.

The transaction ends 270 phase marks the end of the transaction. The transaction ends 270 may comprise: 1) confirm target operation success (block 256), 2) clear the log entry (block 258), 3) send response of successful execution (block 260), and 4) end transaction (block 262).

In step 256, the successful execution of the target operation is confirmed by the calling operation. On confirmation of successful execution, the log entry maintained while executing the read operation of the respective services are cleared, as shown in step 258. A successful acknowledgment may be sent to the application 205, as shown in step 260 to end the transaction, as shown in step 262. This marks the end of a successful transaction.

Figure 3:
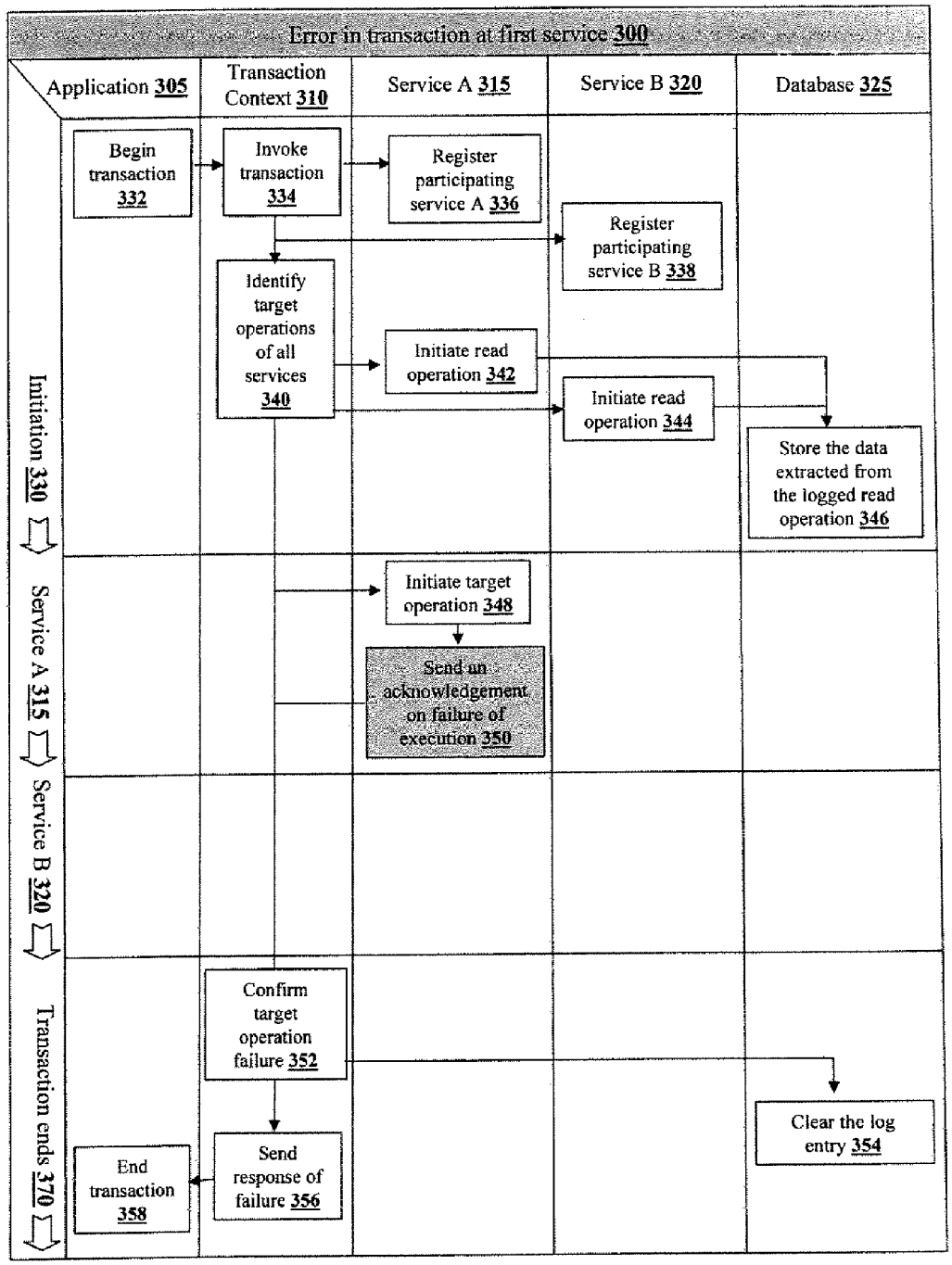
FIG. 3 is a flow diagram illustrating a method of handling an error in transaction at first service, according to one embodiment of the present technique.

Referring to the figures, FIG. 3 is a flow diagram illustrating a method of handling an error in transaction at first service 300, according to one embodiment of the present technique. In one embodiment of the present technique, an application 305 is considered to be comprising one transaction context 310, and two services, which includes service-A 315 and service-B 320 and a database 325. The exemplary embodiment of the present technique is also detailed considering a time bound approach as defined by the execution integrity level of the transaction comprise level.

The method as per one embodiment of the present technique is explained in three phase. The first phase being initiation 330, which details the necessary steps of beginning the transaction. The second phase being the service execution phase, which includes execution of the services to achieve the desired functionality. The third phase is transaction ends 370, which marks the end to the transaction. The steps detailed in the initiation 330 phase is similar to the initiation 230 phase (FIG. 2) of the successful transaction 200. The initiation 330 phase is not detailed again. Each of the other phases will be explained in greater extent in the subsequent sections to follow.

The service execution phase may comprise of execution of two services service-A 315 and service-B 320. The service-A 215 execution comprise: 1) initiate target operation (block 348), and send an acknowledgement (block 350).

In step 348, the target operation of the service-A 315 is initiated. The initiation of target operation of service-A 315 may happen post receiving the acknowledgement from the initiation phase 330 about successfully executing the read operation of service-A and service-B. If the read operation of any of the two services is not executed, the process of revoking the transaction may happen. The transaction context 310 tries to invoke the target operation of the service-A 315. There may be initiation failure of target operation of service-A 310. In that process, a failure acknowledgement is sent back to the transaction context 310, as shown in step 350. This may lead to abortion of initiation of service-B 320 target operation.

The transaction ends 370 phase marks the end of the transaction. The failure of execution of the service-A 310 is acknowledged by the transaction context 310, as shown in step 352. The data stored in the log entry and the read operation placed in queue is cleared, as shown in step 354. The transaction context may then send a failure transaction response to the calling application, as shown in step 356 and marks the end of the un-successful transaction 300 as shown in step 358.

Figure 4:
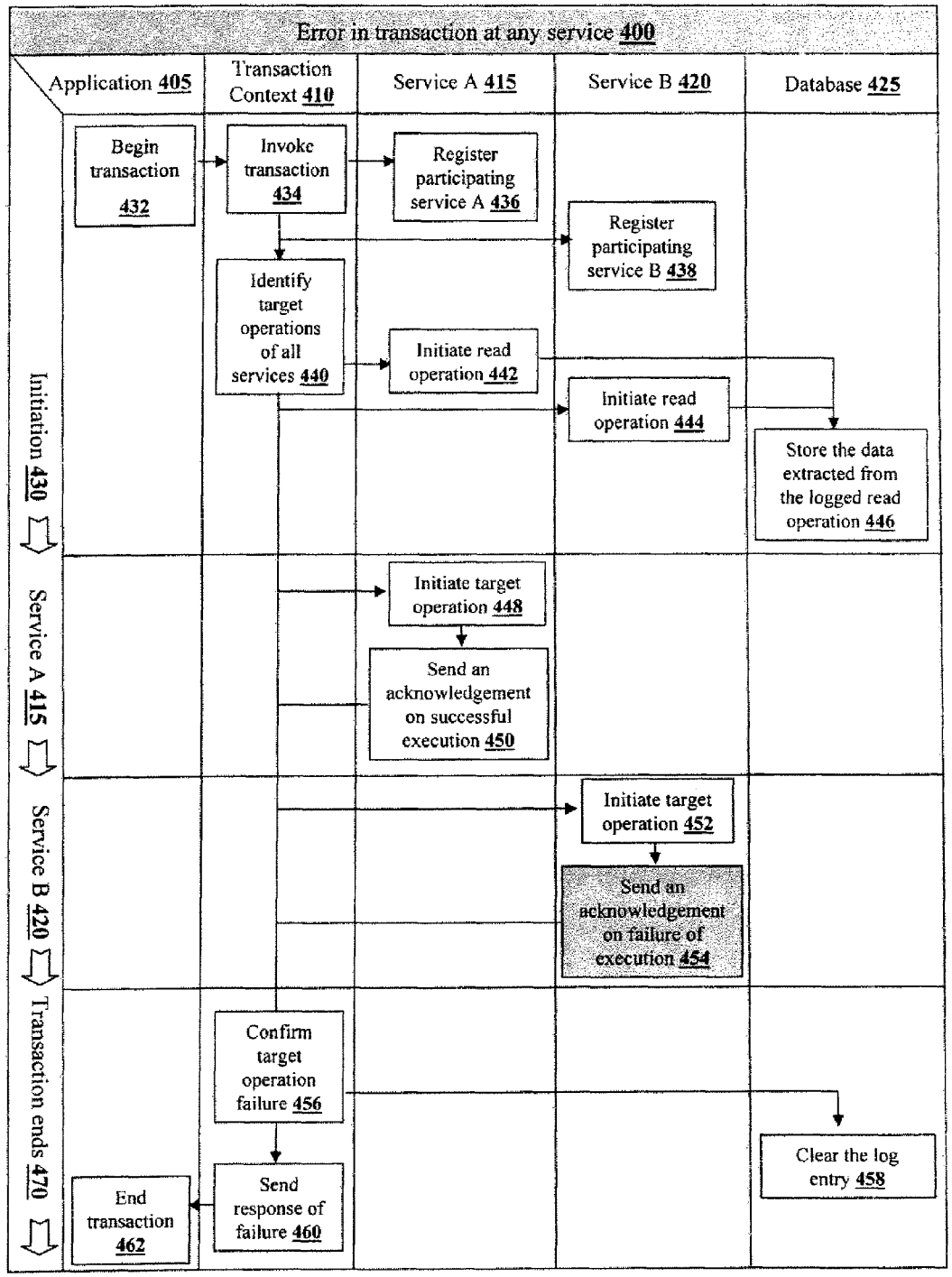
FIG. 4 is a flow diagram illustrating a method of handling the error in transaction occurring in-between services, according to one embodiment of the present technique.

Referring to the figures, FIG. 4 is a flow diagram illustrating a method of handling the error in transaction occurring in-between services 400, according to one embodiment of the present technique. In one embodiment of the preset technique, the current section discuss about a more complex scenario, in which one of the service in between multiple services of the transaction fails. In this process, what all steps which needs to be taken in order to maintain consistency in the transaction in the SOA environment is detailed, as per one embodiment of the present technique. The scope of the handling un-successful transaction occurring in-between services 400 should not be limited in light of the present technique. The present invention may be practiced with modification and alteration within the spirit and scope of the appended claims. Thus, the description is to be regarded as illustrative instead of restrictive on the present invention.

In one embodiment of the present technique, an application 405 is considered to be comprising one transaction context 410, and two services, which includes service-A 415 and service-B 420 and a database 425. The exemplary embodiment of the present technique is also detailed considering a time bound approach as defined by the execution integrity level of the transaction comprise level.

The method as per one embodiment of the present technique is explained once again in three phase. The first phase being initiation 430, which details the necessary steps of beginning the transaction. The second phase being the service execution phase, which includes execution of the services to achieve the desired functionality. In one exemplary embodiment of the present technique, the service phase may include execution of service-A 415 and service-B 420. The third phase is transaction ends 470, which marks the end to the un-successful transaction by taking necessary action (which will be detailed in subsequent sections to follow). Each phase will be explained in greater extent in the subsequent sections to follow.

In one embodiment of the present technique, the steps detailed in the initiation 430 phase is similar to the initiation 230 phase (FIG. 2) of the successful transaction 200. The initiation 430 phase is not detailed again. Each of the other phases will be explained in greater extent in the subsequent sections to follow.

The service execution phase may comprise of execution of two services service-A 415 and service-B 420. The service-A 415 execution comprise: 1) initiate target operation (block 448), and send an acknowledgement (block 450). The service-B execution comprise: 1) initiate target operation (block 452), and send an acknowledgement (block 454).

In step 448, the target operation of the service-A 415 is initiated. The initiation of target operation of service-A 415 may happen post receiving the acknowledgement from the initiation phase 430 about successfully executing the read operation of service-A 415 and service-B 420. If the read operation of any of the two services is not executed, the process of revoking the transaction may happen. The target operation of the service-A 415 is executed, and post execution of the target operation of service-A, a successful acknowledgement is sent to the transaction context 410 to indicate the successful execution of the target operation, as shown in step 450. The execution of the target operation may include updating the data with the target data, as per the transaction.

In step 452, the target operation of the service-B 420 is initiated. The initiation of target operation of service-B 420 may happen post receiving the successful acknowledgement of service-A 415 from transaction context 410. The transaction context 410 then may try to invoke the target operation of the service-B 420. There may be initiation failure of target operation of service-B 420. In that process, a failure acknowledgement is sent back to the transaction context 410, as shown in step 450.

The transaction ends 470 phase marks the end of the transaction. The failure of execution of the service-B 420 is acknowledged by the transaction context 310, as shown in step 452. The transaction context 410 may confirm the failure of the execution of the service-B 420 and revokes the rolling back command to abort the transaction. The process of rolling back may comprise calling the delete operation of the service-A 410 and sub sequentially calling the write operation of the service-A 410. The delete operation of the service-A 410 may obliterate the target data updated in the database 425. The write operation of the service-A 410 may then amend the databases' 425 target data record with the data stored in the log entry while initiating the read operation of the service-A 410. The data stored in the log entry and the read operation placed in queue is cleared, as shown in step 458. The transaction context may then send a failure transaction response to the calling application, as shown in step 460 and marks the end of the un-successful transaction 400 as shown in step 462. The inventive steps detailed as per one embodiment of the present technique, may help in maintaining data consistency while transaction in the SOA environment.

Figure 5:
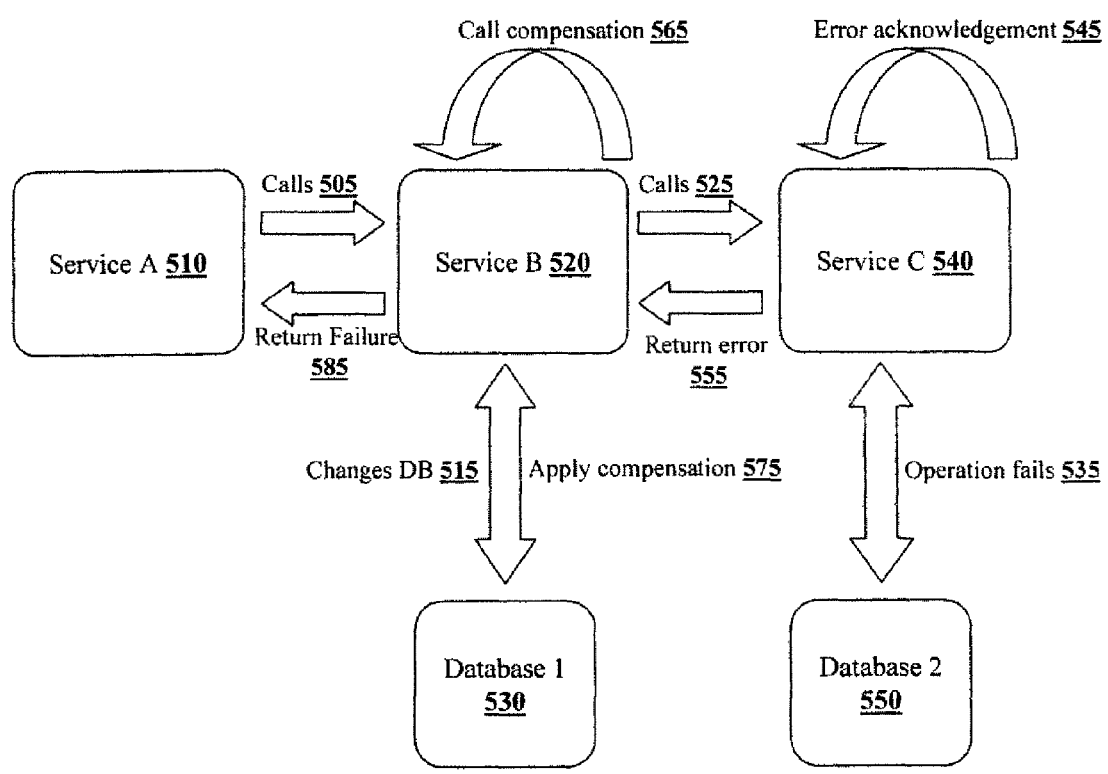
FIG. 5 is a flow diagram illustrating a method of rolling back the transaction using a compensation service, according to one embodiment of the present technique.

Referring to the figures, FIG. 5 is a flow diagram illustrating a method of rolling back the transaction using a compensation service, according to one embodiment of the present technique. In one embodiment of the present technique, revoking the transaction, on encountering an error may further include compensating the executed target operation of the respective service. In ideal situation, any changes done on the database during the SOA based transaction may be reverted to the original data on the database, in case there is failure somewhere in the target operation along the flow of the transaction. This process of reverting the original data is precisely happens in a roll back process. In the SOA, a situation may arise where the roll back is not an option. In that case instead of a rollback, the compensation may be provided. The process of compensation is detailed in the subsequent section to follow.

In one embodiment of the present technique, the method includes involvement of a service-A 510, a service-B 520, a database-1 530, a service-C 540, and a database-2 550 for the transaction. The method comprising: 1) calls (block 505), 2) change database (block 515), 3) calls (block 525), 4) operation fails (block 535), 5) error acknowledgement (block 545), 6) return error (block 565), 7) call compensation (block 565), 8) apply compensation (block 575), and 9) return failure (block 585).

In step 505, the target operation of the service-A 510 calls service-B 520 for execution. The target operation of the service-B 520 gets initiated and the target operation may later make the changes in the database-1 530, as shown in step 515. On receipt of successful acknowledgement service-B 520 may then call service-C 540 as shown in step 525. The target operation of the service-C 540 is initiated and the target operation may fail in doing the desired functionality, as shown in step 535. An error acknowledgement may be generated by the service-C 540 as shown in step 545. The generated error acknowledgement may be returned to the previous service, which may be service-B 520 as shown in step 555. On receipt of error message from the service-C 540 a compensation service may be called service-B 520 as shown in step 565. The compensation is applied to the database-1 530 by the service-B 520, as shown in step 575. The compensation service may include sending an e-mail to the concerned user about undone of the function due to the technical snag in the transaction. The failure may be retuned to the service-A 510 from service-B 520 as shown in step 585 indicating the un-successful service execution at service-C 540, which may later passed to the transaction context and in turn the called application.

The compensation may be defined as the most logical changes applied to the resources to maintain data consistency and integrity. In one embodiment of the present technique, the compensation may be performed at the previous service to negate the effect caused by the transaction. The exemplary example may include the first service sent out an e-mail announcing that the changes has been implemented, the compensatory operation may be to send another e-mail announcing the failure of the transaction in the second service and the changes that has been done earlier by the first service is undone.

In one embodiment of the present technique, the method of handling transaction of a plurality of enterprises embracing the SOA in their business interaction may also need to address the concurrency issue in the business interaction.

The data shared by many applications may have dirty reads which results in integrity loss. Some applications may have stringent requirements for maintaining consistency to run their business. Many business transactions are long running, which may run for hours or days. With these constraints and requirements, the level of possible data consistency needs to be decided. Because the higher the level for data consistency, the higher the performance overhead for the applications. So is the case with SOA, the transaction may need to comply with a transaction compromise level according to the complexity of the business interaction. The transaction compromise level is the level with which business may compromise with the business information. The transaction compromise level may define an execution integrity level for one or more operations of the respective service. Thus, the execution integrity level may define transaction isolation for the application, which may be achieved by holding locks on resources (may be the database of the organization, for this instance). The transaction compromise level defining the execution integrity level may be defined by technical analysts or information architects after a close study of the business functionalities involved in the transactions.

In one embodiment of the present technique, the four scenarios are detailed to understand in detail how the transaction compromise level may be determined for various applications of the enterprises.

The first scenario is a low risk business transaction. In a low risk business scenario where data is mostly used for retrieval or read purposes, the system may not be concerned whether the data being read is the latest version or not. The dirty read is possible during transactions. Thus, the transaction system allows dirty reads and concurrent updates of data may take place without taking into account the integrity of the updated data. Basically the callback operations will have no major lock implementations. The data getting stored will be the latest one updated.

The second scenario is an average risk business transaction. In this situation, the transaction system maintains (a) a log of all the records before the service performed an update, (b) a log of the records after the service updated (with its timestamp) and then check the records for that particular identification key whether the timestamp is same (after the service failure) for that or not. At this level, the basic call back operations will not have major lock implementations. But the operations will keep a track of the timestamp to maintain the latest successful complete transactional data information. This kind of normal implementation is suitable for SOA application systems without locking resources and maintaining a suitable amount of data integrity.

The third scenario is a high risk business transaction. In the high risk business, the read operation may have a lock over the records and the lock persists till the transaction completes. The write operation may release the locks after its processing logic. Hence, no other service is allowed to change that record during the transaction.

The fourth scenario is a maximum risk business transaction. In the maximum risk business, the lock over the entire table is acquired and it persists till the transaction completes. This ensures that nobody else (any third party application or service) is able to modify data contained in that table. The read may lock the table and the write operation may release the lock after its execution of redo logic in the revoke process.

Figure 6:
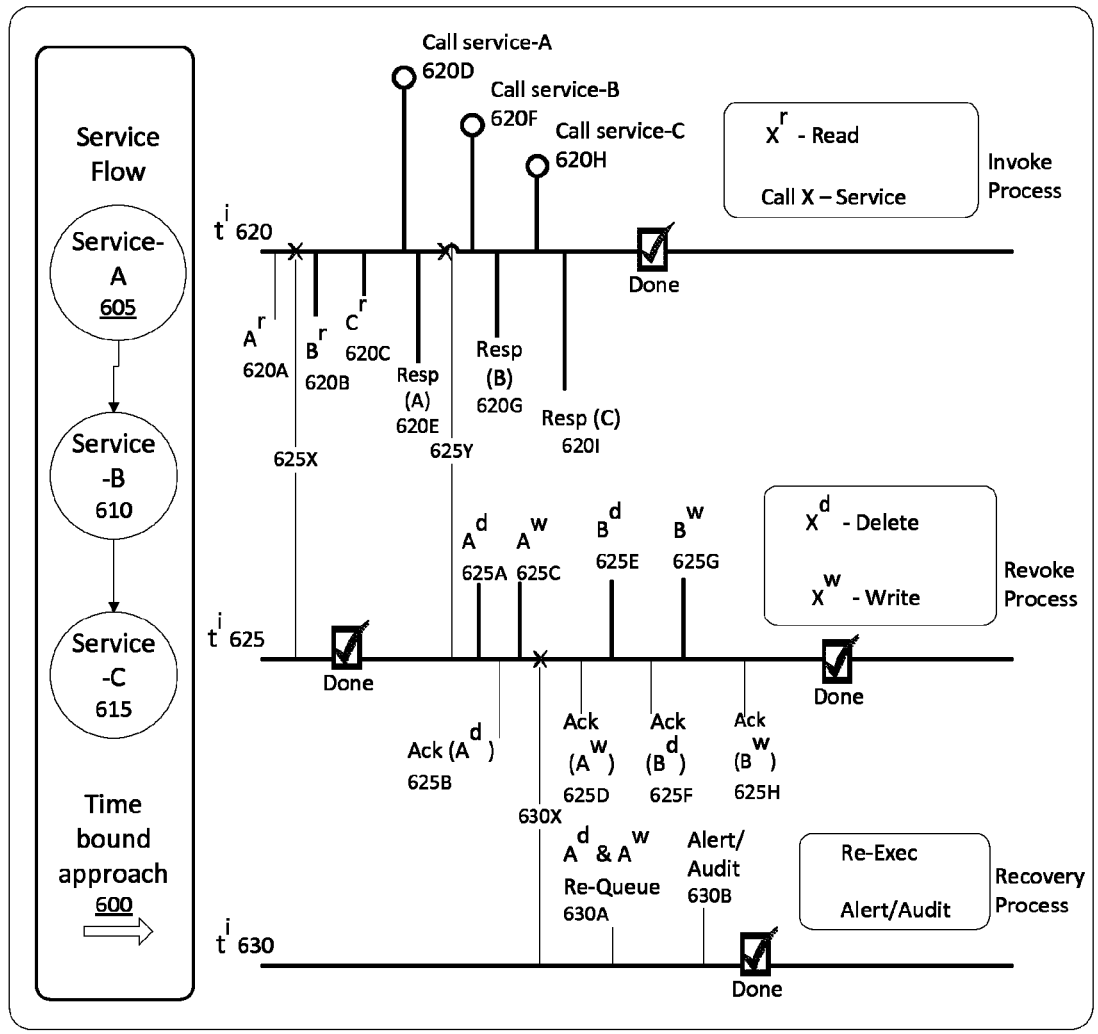
FIG. 6 is a flow diagram illustrating a method of handling transaction using a time bound approach.

Referring to the figures, FIG. 6 is a flow diagram illustrating a method of handling transaction using a time bound approach 600. In one embodiment of the present technique, the method of handling transaction initiated by the application, where there may be an orchestration of three services-A 605, service-B 610 and service-C 615 is explained. In the time bound approach 600 three time axis is considered for explaining the flow of sequence. The first time axis $t^i$ 620 may explain sequential flow of all operations for successful execution of the all service to achieve the desired functionality. The second time axis $t^i$ 625 may explain the sequential flow of all operations for un-successful execution of one or more service. The third time axis $t^i$ 630 may sequential flow of operations when there is an error encountered during callback of one or more operation to revoke the service.

In one embodiment of the present technique, handing the transaction in the time axis $t^i$ 620 may include initiating a read operation of all three services. The read operation $A''$ 620A, $B''$ 620B, and $C''$ 620C of the services, service-A, service-B and service-C maintains the log entry of a data from the respective database (not shown in figure) with a time stamp on the data to indicate the data detail at that time interval. The service-A 605 is called, as shown in step 620D to achieve the desired function of service-A. The desired functionality may be achieved by inserting a target data in the database (not shown) marking the successful execution of the service-A 605. On successful execution of service-A 605, an acknowledgement Resp (A) 620E is sent back the transaction context (not shown) to indicate the successful execution of the service-A 605. Upon receipt of the acknowledgement Resp (A) 620E service-B 610 is called, as shown in step 620F to achieve the desired function of service-B 610. The desired functionality may be achieved by inserting a target data in the database (not shown) marking the successful execution of the service-B 610. Similarly, on successful execution of service-B 610, an acknowledgement Resp (B) 620G is sent back the transaction context (not shown) to indicate the successful execution of the service-B 610. Upon receipt of the acknowledgement Resp (B) 620G service-C 615 is called, as shown in step 620H to achieve the desired function of service-C 615. The desired functionality may be achieved by inserting a target data in the database (not shown) marking the successful execution of the service-C 615. On successful execution of service-C 615, an acknowledgement Resp (C) 620I is sent back the transaction context (not shown) to indicate the successful execution of the service-C 615. The successful acknowledgement Resp (C) 620I marks the end of transaction by clearing the log entry maintained during initiating the read operations of respective services.

In one embodiment of the present technique, handing the transaction in the time axis $t^i$ 625 may include initiating a sequence of operations, when there may be an error before service-A 605 is called as shown in step 625X or after service-A 605 is called as shown in step 625Y. The error may even occur probably during the invocation of the service-B 610, as shown in step 620F. On occurrence of such error either before the invocation of service-A 605 as shown in step 625X or during invocation of service-B 610 as shown in step 625Y, the respective services one or more call back operations are called to revoke the executed services. The call back operation may include a delete operation or a write operation or both. The service-A 605 delete operation $A^d$ 625A is called to obliterate the target data, which is inserted by the target operation (not shown) of the service-A 605. On successful receipt of an acknowledgement Ack ($A^d$) 625B the write operation $A^W$ 625C of service-A 605 is called to amend the obliterated target data with the data maintained in the log entry to maintain the data consistency. Similarly, the service-B 610 delete operation $B^d$ 625E is called to obliterate the target data, which is inserted by the target operation (not shown) of the service-B 610, on receipt of a successful acknowledgement Ack ($A^W$) 625D from service-A 605. Post deleting the data, a successful acknowledgement Ack ($B^d$) 625F may be sent to the transaction context (not shown). On successful receipt of an acknowledgement Ack ($B^d$) 625F the write operation $B^W$ 625G of service-B 610 is called to amend the obliterated target data with the data maintained in the log entry to maintain the data consistency. Again on receipt of the successful acknowledgement Ack ($B^W$) 625H from service-B 610 the transaction is closed.

In one embodiment of the present technique, the time axis $t^i$ 630 may include initiating one or more operations, when there is an error encountered during the call back operations. This may be expected to be very rare occasion but then to tackle this, the system may propose the use of queue based system, as shown in step 630A for revoking the transaction or make use of administrator by leveraging proper audit and monitor reports, as shown in step 630B.

Thus, in the time bound approach 600 of handing the transaction, the first time axis $t^i$ 620 is for a normal execution of an orchestration, the second time axis $t^i$ 625 is for revocation of one or more operations and the last axis $t^i$ 630 is for a final edge in resolving the case of serious disaster.

In one embodiment of the present technique, the advantage of handling the transaction of a plurality of enterprises embracing SOA in their business interaction may include improved collaboration across different administrative domains, rapid enhanced deployment of reusable functionalities, flexibility to adapt to B2B business process, and inherently reduced development and maintenance cost in addition to the data integrity of business information across different systems.

While the present invention has been related in terms of the foregoing embodiments, those skilled in the art will recognize that the invention is not limited to the embodiments depicted. The present invention can be practiced with modification and alteration within the spirit and scope of the appended claims. Thus, the description is to be regarded as illustrative instead of restrictive on the present invention.

Exemplary Computing Environment

Figure 7:
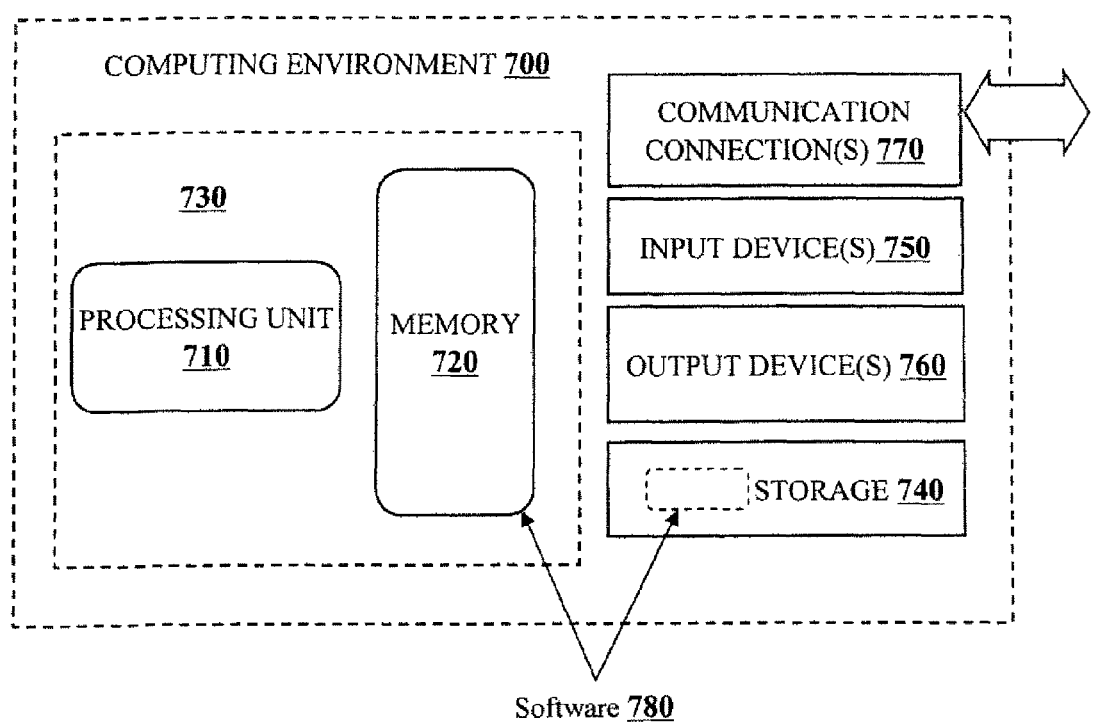
FIG. 7 is a system illustrating a generalized computer network arrangement, in one embodiment of the present technique.

One or more of the above-described techniques can be implemented in or involve one or more computer systems. FIG. 7 illustrates a generalized example of a computing environment 700. The computing environment 700 is not intended to suggest any limitation as to scope of use or functionality of described embodiments.

With reference to FIG. 7, the computing environment 700 includes at least one processing unit 710 and memory 720. In FIG. 7, this most basic configuration 730 is included within a dashed line. The processing unit 710 executes computer-executable instructions and may be a real or a virtual processor. In a multi-processing system, multiple processing units execute computer-executable instructions to increase processing power. The memory 720 may be volatile memory (e.g., registers, cache, RAM), non-volatile memory (e.g., ROM, EEPROM, flash memory, etc.), or some combination of the two. In some embodiments, the memory 720 stores software 780 implementing described techniques.

A computing environment may have additional features. For example, the computing environment 700 includes storage 740, one or more input devices 750, one or more output devices 760, and one or more communication connections 770. An interconnection mechanism (not shown) such as a bus, controller, or network interconnects the components of the computing environment 700. Typically, operating system software (not shown) provides an operating environment for other software executing in the computing environment 700, and coordinates activities of the components of the computing environment 700.

The storage 740 may be removable or non-removable, and includes magnetic disks, magnetic tapes or cassettes, CD-ROMs, CD-RWs, DVDs, or any other medium which can be used to store information and which can be accessed within the computing environment 700. In some embodiments, the storage 740 stores instructions for the software 780.

The input device(s) 750 may be a touch input device such as a keyboard, mouse, pen, trackball, touch screen, or game controller, a voice input device, a scanning device, a digital camera, or another device that provides input to the computing environment 700. The output device(s) 760 may be a display, printer, speaker, or another device that provides output from the computing environment 700.

The communication connection(s) 770 enable communication over a communication medium to another computing entity. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Implementations can be described in the general context of computer-readable media. Computer-readable media are any available media that can be accessed within a computing environment. By way of example, and not limitation, within the computing environment 700, computer-readable media include memory 720, storage 740, communication media, and combinations of any of the above.

Having described and illustrated the principles of our invention with reference to described embodiments, it will be recognized that the described embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of the described embodiments shown in software may be implemented in hardware and vice versa.

In view of the many possible embodiments to which the principles of our invention may be applied, we claim as our invention all such embodiments as may come within the scope and spirit of the following claims and equivalents thereto.

The invention claimed is:

1. A method of handling transactions for one or more organizations implementing a service oriented architecture (SOA) in their business interactions, the method comprising:
   receiving a registration request from at least one user application registering for a transaction context corresponding to a transaction sought to be invoked by the at least one user application, wherein the transaction context comprises one or more services associated with the transaction;
   invoking the transaction, wherein invoking comprises:
      identifying one or more data elements required by one or more of the user applications to invoke the transaction;
      specifying a transaction compromise level for one or more of the user applications, wherein the transaction compromise level defines transaction isolation of the one or more data elements required by the corresponding user applications;
      recognizing and determining, by a processor, availability of services associated with the registered transaction context, wherein the recognized services provide functionality required by the user applications;
      identifying operations required for providing each of the recognized services;
      executing the operations required by each of the recognized services; and
      revoking the transaction by rolling back the executed operations of the respective recognized services when at least one of the identified operations of the recognized services encounters an error during the transaction.

2. The method of claim 1, wherein one or more services associated with the transaction context are identified in a coordination service.

3. The method of claim 1, wherein the required transaction isolation is defined by at least one of a time bound approach or a lock bound approach.

4. The method of claim 1, wherein operations required for executing the recognized services include at least one of a read operation a write operation, a delete operation, or a target operation, said target operation comprising any data modifying operation executed to achieve the functionality required by the user applications.

5. The method of claim 4, wherein operations required by the recognized services are executed sequentially.

6. The method of claim 4, wherein the read operation for executing the recognized service includes reading a current state of a database and placing the read operation in a queue.

7. The method of claim 6, wherein the read operation further includes maintaining a log entry of data from the current state of the database at a service layer or at a coordination messaging layer.

8. The method of claim 7, wherein maintaining the log entry is at least one of a time bound process or an alert bound process or both.

9. The method of claim 8, wherein maintaining the log entry in the time bound process includes recording the data available in the database with a timestamp.

10. The method of claim 7, wherein the data maintained in the log entry is cleared after execution of all services.

11. The method of claim 4, wherein read operations for recognized services are initiated prior to initiation of other operations required by the recognized services.

12. The method of claim 4, wherein the target operation includes executing one or more tasks required by the respective recognized service for achieving the functionality required by the user applications.

13. The method of claim 4, wherein the target operation includes at least one of a successful acknowledgement receipt from the plurality of read operations of the recognized services or a successful acknowledgement receipt from an earlier executed recognized service.

14. The method of claim 4, wherein the encountered error includes at least one of a failure occurring while invoking the transaction, or a failure occurring while initiating the read operation of the respective service, or a failure occurring while executing the target operation, or a time out error occurring while executing the plurality of operations.

15. The method of claim 4, wherein rolling back an executed operation includes rolling back a target operation by calling a delete operation followed by a write operation.

16. The method of claim 15, wherein the delete operation obliterates target data previously updated by the target operation selected for rolling back.

17. The method of claim 15, wherein the write operation includes replacing target data previously updated by the target operation selected for rolling back, with data maintained in the form of log entries while executing read operations for the respective recognized services.

18. The method of claim 1, wherein revoking the transaction further includes compensating the executed target operation of the respective service.

19. A computer program product comprising a non-transitory computer usable medium having a computer readable program code embodied therein for handling transactions for one or more organizations implementing a service oriented architecture (SOA) in their business interactions, the architecture comprising:
   processor-executable program code adapted to register at least one user application for a transaction context corresponding to a transaction sought to be invoked by the at least one user application, wherein the transaction context comprises one or more services associated with the transaction;

processor-executable program code adapted for invoking the transaction, wherein the invoking comprises:

identifying one or more data elements required by one or more of the user applications to invoke the transaction;

specifying a transaction compromise level for one or more of the user applications, wherein the transaction compromise level defines transaction isolation of the one or more data elements required by the corresponding user applications;

recognizing and determining availability of services associated with the registered transaction context, wherein the recorgnized services provide functionality required by the user application;

identifying operations required for providing each of the recognized services; and executing the operations required by each of the recognized services; and processor-executable program code adapted for revoking the transaction by rolling back the executed operations of the respective recognized services when at least one of the identified operations of the recognized services encounters an error during the transaction.

* * * * *

UNITED STATES PATENT AND TRADEMARK OFFICE
CERTIFICATE OF CORRECTION

PATENT NO. : 8,380,679 B2
APPLICATION NO. : 12/366052
DATED : February 19, 2013
INVENTOR(S) : Bijoy Majumdar, Anshuk Pal Chaudhuri and Sunny Saxena It is certified that error appears in the above-identified patent and that said Letters Patent is hereby corrected as shown below:

Title Page, Item 57, Abstract;
Lines 1 and 2, "plurality of organization" should read --plurality of organizations--.
Line 7, "operations which needs" should read --operations which need--.
Line 8, "the respective service" should read --the respective services--.
In the Specification;
Column 1, line 18, "fail" should read --fails--.
Column 1, line 22, after "referred" insert --to--.
Column 1, line 33, "Thus" should read --thus--.
Column 1, line 35, "self contained" should read --self-contained--.
Column 1, line 37, "SOA based" should read --SOA-based--.
Column 1, line 44, "set" should read --sets--.
Column 1, line 46, cancel "," after "though".
Column 1, line 59, "bottleneck" should read --bottlenecks--.
Column 1, line 63, "specification" should read --specifications--.
Column 1, line 63, "standard" should read --standards--.
Column 2, line 3, "transaction" should read --transactions--.

Signed and Sealed this
First Day of March, 2016

Michelle K. Lee
*Director of the United States Patent and Trademark Office*

UNITED STATES PATENT AND TRADEMARK OFFICE
CERTIFICATE OF CORRECTION

| | |
|---|---|
| PATENT NO. | : 8,380,679 B2 |
| APPLICATION NO. | : 12/366052 |
| DATED | : February 19, 2013 |
| INVENTOR(S) | : Bijoy Majumdar, Anshuk Pal Chaudhuri and Sunny Saxena |

It is certified that error appears in the above-identified patent and that said Letters Patent is hereby corrected as shown below:

Title Page, Item 57, Abstract;
Lines 1 and 2, "plurality of organization" should read --plurality of organizations--.
Line 7, "operations which needs" should read --operations which need--.
Line 8, "the respective service" should read --the respective services--.
In the Specification;
Column 1, line 18, "fail" should read --fails--.
Column 1, line 22, after "referred" insert --to--.
Column 1, line 33, "Thus" should read --thus--.
Column 1, line 35, "self contained" should read --self-contained--.
Column 1, line 37, "SOA based" should read --SOA-based--.
Column 1, line 44, "set" should read --sets--.
Column 1, line 46, cancel "," after "though".
Column 1, line 59, "bottleneck" should read --bottlenecks--.
Column 1, line 63, "specification" should read --specifications--.
Column 1, line 63, "standard" should read --standards--.
Column 2, line 3, "transaction" should read --transactions--.
Column 2, line 11, "embracing" should read --embraces--.
Column 2, line 25, cancel "includes".
Column 2, line 31, "service" should read --services--.
Column 2, line 48-49, "service invoked while transaction" should read --services invoked while transacting--.
Column 2, line 60, "transaction" should read --transactions--.
Column 3, line 11, before "transaction" insert --a--.
Column 3, line 18, after "is" insert --a--.
Column 3, line 36, after "handling" insert --a--.
Column 3, line 40, after "handling" insert --a--.
Column 3, line 40, "issue" should read --issues--.

This certificate supersedes the Certificate of Correction issued March 1, 2016.

Signed and Sealed this
Twelfth Day of April, 2016

Michelle K. Lee
*Director of the United States Patent and Trademark Office*

In the Specification;
Column 3, line 41, "issue" should read --issues--.
Column 3, line 41, after "during" insert --a--.
Column 3, line 57, after "handling" insert --a--.
Column 3, line 67, "context" should read --contexts--.
Column 4, line 20, "access" should read --accesses--.
Column 4, line 26, "function" should read --functions--.
Column 4, line 34, "context" should read --contexts--.
Column 4, line 35, after "comprise" insert --a--.
Column 4, line 53, after "comprising" insert --a--.
Column 4, line 60, after "service" insert --is--.
Column 4, line 61, "on their own" should read --on its own--.
Column 5, line 3, "service" should read --services--.
Column 5, line 13, "services" should read --service--.
Column 5, line 13, after "for" insert --a--.
Column 5, line 19, "services" should read --service--.
Column 5, line 22, "service" should read --services--.
Column 5, line 44, "are" should read --is--.
Column 5, line 63, "operation" should read --operations--.
Column 6, line 30, cancel the word "the" (third occurrence).
Column 6, line 42, "operation" should read --operations--.
Column 6, line 44, "operations" should read --operation--.
Column 6, line 49, cancel the word "the" (first occurrence).
Column 6, line 52, "operation" should read --operations--.
Column 6, line 59, "operation" should read --operations--.
Column 7, line 5, "operation" should read --operations--.
Column 7, line 24, "on" should read --of--.
Column 7, line 26, "phase" should read --phases--.
Column 7, line 26, "being" should read --is--.
Column 7, line 28, "being" should read --is--.
Column 7, line 33, "ends" should read --end--.
Column 7, line 49, "organization" should read --organizations--.
Column 7, line 50, after "of" insert --a--.
Column 8, line 2, "service" should read --services--.
Column 8, line 3, "are" should read --is--.
Column 8, line 3, "in" should read --is--.
Column 8, line 11, cancel the word "of".
Column 8, line 12, between "services" and "service" insert --,--.
Column 8, line 13, "comprise" should read --comprises--.
Column 8, line 15, "comprise" should read --comprises--.
Column 8, line 47, "are" should read --is--.
Column 8, line 63, "phase" should read --phases--.
Column 8, line 63, "being" should read --is--.
Column 8, line 65, "being" should read --is--.
Column 9, line 7, cancel the word "of".

CERTIFICATE OF CORRECTION (continued)
U.S. Pat. No. 8,380,679 B2

In the Specification;
Column 9, line 8, between "services" and "service" insert --,--.
Column 9, line 9, "comprise" should read --comprises--.
Column 9, line 36, "discuss" should read --discusses--.
Column 9, line 37, "service" should read --services--.
Column 9, line 38, cancel "what".
Column 9, line 39, "needs" should read --need--.
Column 9, line 40, "is" should read --are--.
Column 9, line 47, "on" should read --of--.
Column 9, line 49, "comprising" should read --comprised of--.
Column 9, line 50, "includes" should read --include--.
Column 9, line 56, "phase" should read --phases--.
Column 9, line 57, "being" should read --is--.
Column 9, line 58, "being" should read --is--.
Column 10, line 2, "is" should read --are--.
Column 10, line 7, cancel "of".
Column 10, line 49, "is" should read --are--.
Column 10, line 54, cancel the "," after "technique".
Column 10, line 60, after "error" insert --,--.
Column 10, line 62, "In ideal" should read --In an ideal--.
Column 10, line 66, cancel "is".
Column 11, line 35, after "later" insert --be--.
Column 11, line 42, after "service" insert --which--.
Column 11, line 46, "has" should read --had--.
Column 11, line 46, "is" should read --are--.
Column 11, line 60, "is" should read --in--.
Column 12, line 29, cancel "a".
Column 12, line 48, "transaction" should read --transactions--.
Column 12, line 50, "transaction" should read --transactions--.
Column 12, line 56, "service" should read --services--.
Column 12, line 59, after "may" insert --explain the--.
Column 12, line 61, "operation" should read --operations--.
Column 13, line 26, after "of" insert --the--.
Column 13, line 29, "handing" should read --handling--.
Column 13, line 38, after "services" insert --of--.
Column 13, line 63, after "be" (second occurrence) insert --a--.
Column 14, line 1, "handing" should read --handling--.
Column 14, line 21, "on" should read --of--.
In the Claims;
Column 16, line 6, after "operation" (first occurrence) insert --,--.